United States Patent [19]

Wu

[11] 3,788,291

[45] Jan. 29, 1974

[54] UNITIZED DISTRIBUTOR VACUUM SPARK ADVANCE CONTROL VALVE WITH REGULATOR

[75] Inventor: Tao-Yuan Wu, Ann Arbor, Mich.

[73] Assignee: Ford Motor Company, Dearborn, Mich.

[22] Filed: Oct. 4, 1972

[21] Appl. No.: 295,049

[52] U.S. Cl............................ 123/117 A, 123/97 B
[51] Int. Cl............................................. F02p 5/04
[58] Field of Search........... 123/117 A, 117 R, 97 B

[56] References Cited
UNITED STATES PATENTS

| 2,698,612 | 1/1955 | Schaefer | 123/117 A |
| 3,479,998 | 11/1969 | Walker | 123/117 A |
| 3,503,377 | 3/1970 | Beatenbough et al. | 123/117 A |
| 3,626,914 | 12/1971 | Brownson | 123/117 A |

Primary Examiner—Laurence M. Goodridge
Assistant Examiner—Cort Flint

[57] ABSTRACT

An engine spark timing control system includes a conduit connecting carburetor spark port vacuum to the distributor servo actuator in parallel paths one of which contains an orifice for normally slowly advancing the ignition timing as a function of changes in spark port vacuum; the system also includes a valve operable at low vacuum force levels in response to predetermined acceleration movements of the throttle valve to disconnect or block the direct connection from the spark port to the distributor servo while at the same time connecting a vacuum reservoir to the servo to artificially advance the ignition timing above the value that normally would be called for by the spark port vacuum level; the higher than normal advance decaying by bleed of the vacuum through the spark port line orifice until the vacuum level equals that at the spark port, at which time the ignition timing will be returned to normal; the device further including a vacuum relief valve to limit the maximum level of vacuum in the reservoir so as not to unduly advance the ignition timing beyond a desired value.

5 Claims, 1 Drawing Figure

PATENTED JAN 29 1974    3,788,291
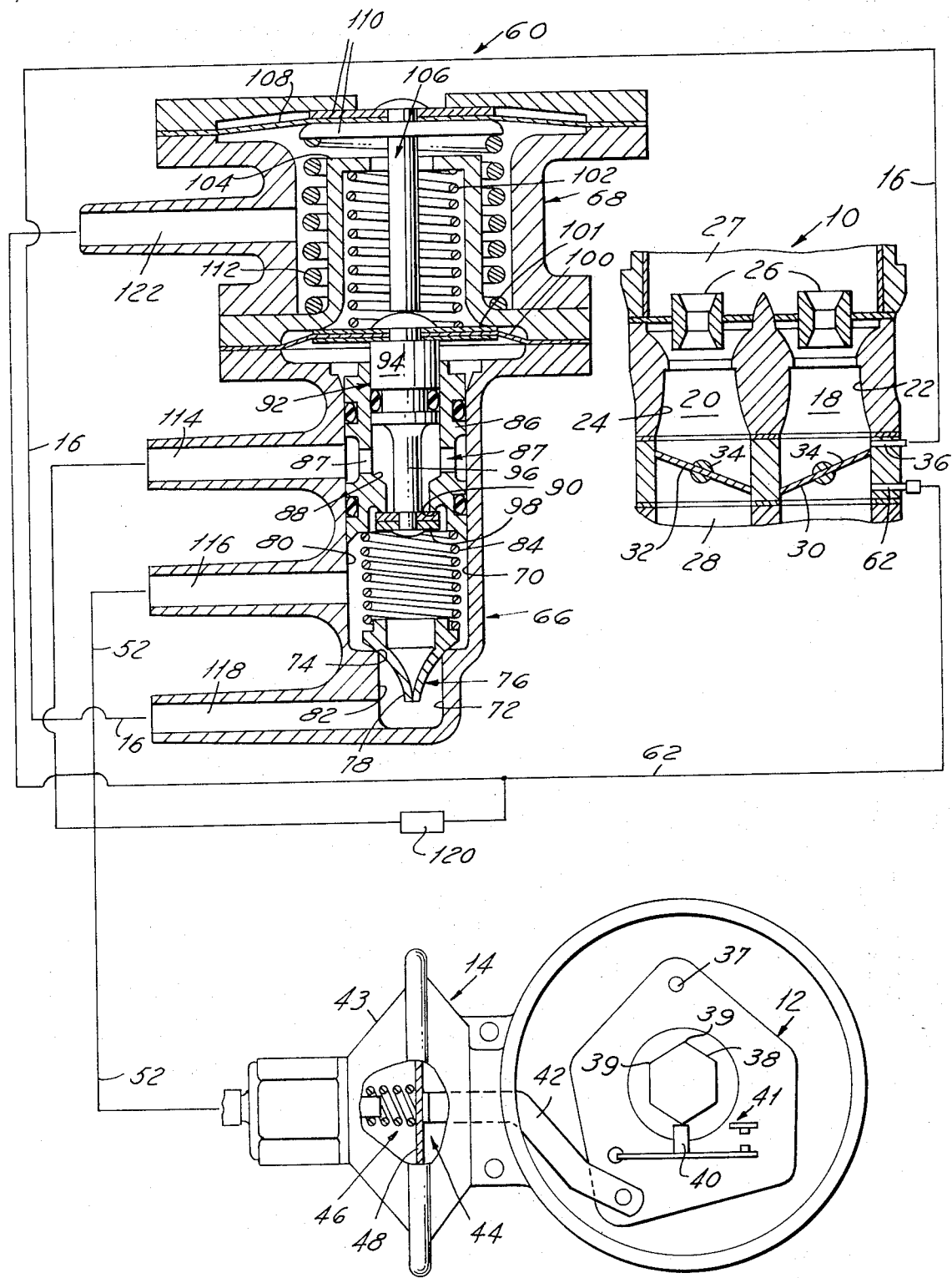

UNITIZED DISTRIBUTOR VACUUM SPARK ADVANCE CONTROL VALVE WITH REGULATOR

This invention relates, in general, to an engine spark timing control system. More particularly, it relates to one in which the engine timing is artificially advanced during heavy acceleration modes of operation to prevent backfiring through the carburetor, the ignition timing being returned to a normal setting after a predetermined time delay determined by a flow restrictor that limits the artificial advance of the timing to a desired value.

This invention is an improvement on the engine spark timing control shown and described in copending application Ser. No. 232,806 to T. Y. Wu, Distributor Vacuum Spark Advance Control Valve with Regulator, filed Mar. 8, 1972, and having a common assignee. The latter application is directed to an engine ignition timing control that temporarily advances the spark timing during accelerative modes of operation to prevent backfiring through the carburetor. The use of lower compression ratio engines to utilize low lead fuel generally lengthens the total combustion period to a point where at high engine rpms, for example, during certain accelerations, the combustion may continue through the power stroke into a portion of the intake stroke. A portion of the burning mixture may then pass through the open intake valve into the intake manifold from where a pressure pulse wave may pass back into the carburetor.

The device shown in Ser. No. 232,806 eliminates the backfiring problem by temporarily advancing the engine ignition timing during accelerations so that the burning charge does not reach the intake manifold. This is done by connecting an auxiliary source of vacuum at a higher level from a tank to the distributor servo actuator during accelerations, the auxiliary vacuum then decaying by bleed to spark port vacuum level through an orifice.

The source of auxiliary vacuum for the storage tank is a manifold vacuum port in the carburetor induction passage. During vehicle decelerations, it normally is possible for the manifold vacuum level to be very high, say, 25-30 inches hg., for example. Under certain operating conditions, therefore, the reservoir vacuum could possibly advance the ignition timing far higher than would be desirable, since detonation then may result.

Ser. No. 232,806 eliminates the above disadvantage by providing a vacuum regulator valve with a built-in flow restriction that operates automatically to limit the maximum value of reservoir vacuum that can act to temporarily advance the ignition during accelerations.

This invention relates to a spark control device that has all the advantages of that shown and described in my copending application, but is of a more compact, unitized construction, and one that provides ease of assembly and is economical to manufacture and repair.

It is a primary object of the invention, therefore, to provide a spark timing control device of the type described that is of a simplified construction that is easy to assemble and disassemble, and economical to manufacture.

Other objects, features and advantages of the invention will become more apparent upon reference to the succeeding detailed description thereof, and to the drawing illustrating a preferred embodiment thereof, wherein the figure illustrates schematically a cross-sectional view of an engine spark timing system embodying the invention.

The figure includes only those portions of an engine ignition timing system that are typical components, such as, for example, a carburetor 10, a distributor breaker plate 12, a vacuum servo 14 to control the movement of breaker plate 12, and a vacuum line 16 connected between the carburetor and vacuum servo. The latter normally automatically changes the engine spark timing setting as a function of changes in engine vacuum spark port setting.

More specifically, the carburetor 10 in this instance is of the downdraft type and shows the primary and secondary bores 18 and 20 of a four-barreled carburetor. Both primary and secondary bores are constructed in a similar manner. Both constitute air/fuel induction passages having the usual fixed area venturis 22, 24. Booster venturis 26 are also provided, through which the main supply of fuel is drawn from means not shown, in a known manner. The bores are open at their upper ends 27 to clean air generally discharged from an air cleaner assembly, and at their lower ends are adapted to be connected to a conventional intake manifold partially indicated at 28. The bores contain primary and secondary throttle valves 30 and 32 respectively, controlling flow through each of the respective passages. The throttle valves are fixed on shafts 34 rotatably mounted in the walls of the carburetor body. The throttle valves are shown in an essentially closed idle speed position and can be rotated to an essentially vertical wide open throttle valve position.

The primary induction passage 18 is provided with a spark port 36 located above the closed position of the primary throttle plate. The spark port reflects the essentially atmospheric pressure level in the inlet when the throttle valve is closed, or the changes in engine manifold vacuum as the throttle valve rotates toward a fully opened position.

As stated previously, the distributor includes a breaker plate 12 that is pivotally mounted at 37 on a stationary portion of the distributor, and movable with respect to a cam 38. The latter has six peaks 39 corresponding to the number of engine cylinders. Each peak cooperates with the follower 40 of a breaker point set 41 to make and break the spark connection in a known manner for each one-sixth, in this case, rotation of cam 38. Pivotal movement of the breaker plate 12 in a counterclockwise spark retard setting direction, or in a clockwise spark advance setting, is provided by an actuator 42 slidably extending from vacuum servo 14.

Servo 14 may be of a conventional construction. It has a hollow housing 43 whose interior is divided by an annular flexible diaphragm 48 into an atmospheric pressure chamber 44 and a vacuum chamber 46. The diaphragm is fixedly secured to actuator 42, and is biased in a rightward retard direction by compression spring 50. Chamber 44 has an atmospheric or ambient pressure vent, not shown, while the chamber 46 is connected to a line 52.

During engine-off and other operating conditions to be described, atmospheric pressure exists on both sides of the diaphragm 48, permitting spring 50 to force the actuator 42 to the lowest advance or a retard setting position. Application of vacuun to chamber 46 moves diaphragm 48 and actuator 42 toward line 52 to an engine spark timing advance position, by degree, as a function of the change in vacuum level.

Turning now to the invention, the ignition system includes a control 60 between the servo chamber 46 and connections to the spark port 36 and to a manifold vacuum port 62. The latter is located in the induction passage 18 below the closed position of the primary throttle 30. The device consists of a compact unitized valve body 64 having two portions 66 and 68 glued together.

Lower portion 66 has a stepped diameter bore 70. At its lower end 72, the differing diameters form a valve seat 74 for a combination one-way check and regulating valve 76. The valve is of the flexible flap type, having resilient rubber ends 78 that normally abutt to seal off all flow in one direction while permitting leakage in the opposite direction. In this case, however, the valve is provided with a built-in orifice (not shown) to provide a controlled leakage in both directions at all times. The valve 76, therefore permits a slow leakage of pressure between the larger diameter bore portion 80 and the smaller 82, in the way of an orifice, and will unseat when the pressure on the lower side exceeds a predetermined amount.

Valve 76 normally is biased to a seated position by the force of a spring 84. The spring would have a force to keep the valve 76 seated for all vacuum below a force of say 15" Hg., for example. The spring is seated at its upper end against a stationary valve guide 86 sealingly fixed in the valve body portion 66. The valve guide has apertures 87 cooperating with a central bore 88, and an annular seat 90 for a slidable regulating valve 92.

Valve 92 has a main body portion 94 formed with a fluted end portion 96. The end portion has a stop seal 98 attached to limit upward movement of the valve as well as stop pressure exchange between opposite sides of the valve end. The upper portion 94 is attached to a flexible annular diaphragm 100 between a pair of retainers 101, the diaphragm having its outer edge sealingly mounted to the valve body. A spring 102, seated against an extension 104 of the valve body, normally biases the valve 92 downwardly to an open position.

The upper main valve body portion 68 includes a plunger 106 movable within the extension 104 to abutt and move valve 92 at times. The plunger is secured to a second annular flexible diaphgram 108 through a pair of retainers 110, and the diaphragm edge is fixed to the valve body. A spring 112 normally biases the diaphragm and plunger upwardly to the position shown, permitting upward closing movement of valve 92.

The regulating valve 92 and check valve 76 control communication between a number of passages 114, 116 and 118. Passage 114 is connected at one end to the valve guide apertures 87, and at its other end to the outlet of a vacuum reservoir or accumulator 120. The reservoir has an inlet connected to the manifold vacuum port 62. The passage 116 is connected to the space between valve guide 86 and valve 76, and is connected at its other end to line 52 leading to servo vacuum chamber 46. The line 118 is connected to the bottom of valve 76 and by line 16 to the carburetor spark port 36. An additional passage 122 connects manifold vacuum at all times in port 62 to the sealed area between diaphragms 100 and 110.

In operation, with the engine running but the primary and secondary throttle valves 30 and 32 in closed or idle speed positions, servo chamber 46 will be at an atmospheric pressure level and the ignition timing will be in a maximum retarded setting. At engine idle, manifold vacuum will be in the range of approximately 14 inches Hg., for example. The force of spring 112 will be chosen so that plunger 106 will not be moved down until the vacuum level rises beyond 16 inches Hg., for example. The force of spring 102 will be chosen such that the vacuum level in 122 must decay to between 2 inches – 4 inches Hg., for example, before the spring begins moving valve 92 downwardly from the position shown.

Accordingly, light vehicle accelerations (6 inches Hg. vacuums, for example) by slowly opening the primary throttle valve 30 in a conventional manner will position the valve 92 as shown. This will bleed the atmospheric pressure in servo line 116 to the carburetor spark port vacuum in passage 118 through valve 76. The ignition timing will then be advanced by degree in proportion to the increase in spark port vacuum.

Low speed decelerations of the engine will maintain a high manifold vacuum in line 122 acting on the end of the valve 92 and, therefore, maintain it in the position shown. The ignition timing then will be slowly retarded by the slow bleed of the lower servo line pressure to the higher pressure in the carburetor spark port line 118.

Assume now, for example, that the vehicle operator rapidly depresses the primary throttle 30 towards a wide open throttle position. The manifold vacuum level at this time, therefore, will immediately decay to below the 2.0 inches – 4.0 inches Hg. level at which valve 92 begins to move down. This will immediately connect the high manifold vacuum from tank 120 in line 114 to the distributor servo line 116 while blocking the connection between line 116 and the carburetor spark port line 118 other than through the flow restricting passage in valve 76. Accordingly, it will be seen that immediately the high vacuum (below 15 inches Hg.) in the reservoir or tank 120 will artificially trigger the servo 14 to advance the ignition timing to a setting above that normally called for by the essentially atmospheric pressure level at the spark port 36.

Assume now that the engine is running at essentially high rpms and that hhe throttle valves are then closed and the engine allowed to decelerate. The manifold vacuum at this time may reach a value of 25 inches Hg., which of course is reflected in the vacuum reservoir or accumulator 120. However, as soon as the vacuum level reaches 16 inches – 18 inches Hg., or high enough to overcome the chosen force of spring 112, the plunger 106 will be moved downwardly. This will bleed the high manifold vacuum in line 114 to the higher pressure level in servo line 116. Line 116 was bled by the initial popoff of valve 76 (above a 15 inches Hg. vacuum level) and the subsequent slower bleed through the fixed orifice in valve 76. The initial result is an artificial advance until the valve 76 bleeds the vacuum in line 116 to spark port level.

While the invention has been described and illustrated in connection with its preferred embodiment, it will be clear to those skilled in the arts to which it pertains that many changes and modifications may be made thereto without departing from the scope of the invention.

I claim:

1. A spark timing control for an engine having a carburetor induction passage with a spark port above the idle speed position of the throttle valve, a distributor breaker plate spring biased in a spark timing retarded setting direction, vacuum servo means normally moving the breaker plate in an advanced timing direction as a function of increases in spark port vacuum applied thereto, conduit means connecting the spark port to the servo means, and control means momentarily advancing the timing to a spark setting advanced above that which would normally be called for according to the level of vacuum at the spark port in response to accelerative opening movement of the throttle valve, and subsequently returning the timing to the spark timing setting called for by the spark port pressure level, the control means comprising a one piece unitary valve body structure having first and second axially aligned valves movable therein between open and closed positions and spring biased to open and closed positions, respectively, the first valve variably controlling communication of pressure between a first line connected to a manifold vacuum reservoir and a first portion of the conduit means connected to the servo means, the second valve controlling communication of pressure between the first portion and a second portion of the conduit means connected to the carburetor spark port, the second valve having means providing at all times a slow bleed down of pressure between the servo means and the spark port while being movable to an open position in response to spark port pressure above the force of the spring means and the servo means pressure, means connecting manifold vacuum to act on the first valve in opposition to the spring means whereby steady state and light acceleration engine operation vacuum levels connects the first and second portions while disconnecting the vacuum reservoir from the first portion so that changes in carburetor spark port vacuum level cause a corresponding change in the spark timing, and whereby heavy accelerations reducing manifold vacuum to a low level connect the reservoir vacuum to the servo means to temporarily advance the timing beyond the setting called for by spark port pressure level until the servo means vacuum is bled to the spark port level, and other means axially aligned with and acting on the first valve to limit reservoir vacuum and thereby the temporary advance and responsive to manifold vacuum levels above a predetermined level indicative of engine deceleration conditions for moving the first valve to temporarily connect reservoir vacuum to the servo means to decay the reservoir vacuum to the servo means pressure level.

2. A spark timing control as in claim 1, including a flexible diaphragm connected to the first valve and acted upon by manifold vacuum in opposition to the first spring means.

3. A spark timing control as in claim 1, the second valve comprising a combination flexible one-way check flap valve and pressure regulating valve.

4. A spark timing control as in claim 1, the other means including second flexible diaphragm means subjected to manifold vacuum on one side and atmospheric pressure on the opposite side and having a plunger engagable with the first valve for moving the same at times to an open position.

5. A spark timing control as in claim 4, including other spring means biasing the plunger in a direction away from the first valve.

* * * * *